United States Patent
Lee et al.

(10) Patent No.: US 8,897,230 B2
(45) Date of Patent: Nov. 25, 2014

(54) CASCADED BASE STATION APPARATUS AND OPERATION METHOD THEREOF

(71) Applicant: Samsung Electronics Co., Ltd., Gyeonggi-do (KR)

(72) Inventors: Honggi Lee, Gyeonggi-do (KR); Dongsuk Kang, Gyeonggi-do (KR); Hyungho Kong, Seoul (KR)

(73) Assignee: Samsung Electronics Co., Ltd (KR)

( * ) Notice: Subject to any disclaimer, the term of this patent is extended or adjusted under 35 U.S.C. 154(b) by 112 days.

(21) Appl. No.: 13/753,071

(22) Filed: Jan. 29, 2013

(65) Prior Publication Data

US 2013/0195050 A1 Aug. 1, 2013

(30) Foreign Application Priority Data

Jan. 30, 2012 (KE) .................. 10-2012-0008972

(51) Int. Cl.
H04Q 7/00 (2006.01)
H04Q 7/24 (2006.01)
H04W 72/04 (2009.01)
H04W 36/00 (2009.01)
H04W 28/06 (2009.01)
H04W 88/08 (2009.01)

(52) U.S. Cl.
CPC .......... H04W 72/04 (2013.01); H04W 72/0453 (2013.01); H04W 28/06 (2013.01); H04W 88/08 (2013.01); H04W 36/00 (2013.01)
USPC .......................................... 370/328; 370/338

(58) Field of Classification Search
None
See application file for complete search history.

(56) References Cited

U.S. PATENT DOCUMENTS 6,212,388 B1 * 4/2001 Seo ................................ 455/450
2010/0074217 A1 * 3/2010 Kim et al. ..................... 370/330

* cited by examiner

Primary Examiner — Hong Cho
(74) Attorney, Agent, or Firm — The Farrell Law Firm, P.C.

(57) ABSTRACT

A method and an apparatus are provided for operating a cascaded base station. Downlink data is received from a plurality of sub-base stations, each of the plurality of sub-base stations having at least one sector, and each of the at least one sector using at least one Frequency Allocation (FA). Data is extracted per FA from the downlink data. The data per sector is rearranged and re-mapped. The data per sector is transmitted to corresponding Remote Radio Units (RRUs).

16 Claims, 11 Drawing Sheets

CASCADED BASE STATION APPARATUS AND OPERATION METHOD THEREOF

PRIORITY

This application claims priority under 35 U.S.C. 119(a) to an application filed in the Korean Intellectual Property Office on Jan. 30, 2012, and assigned Serial No. 10-2012-0008972, the contents of which are incorporated herein by reference.

BACKGROUND OF THE INVENTION

1. Field of the Invention

The present invention relates generally to a cascaded base station and, more particularly, to a cascaded base station and an operation method thereof for connecting a plurality of sub-base stations and a plurality of Remote Radio Units (RRUs) via a radio resource expansion device in a cascaded manner so as to operate as a single base station in a time domain and share the RRUs having respective cells.

2. Description of the Related Art

Figure 1:
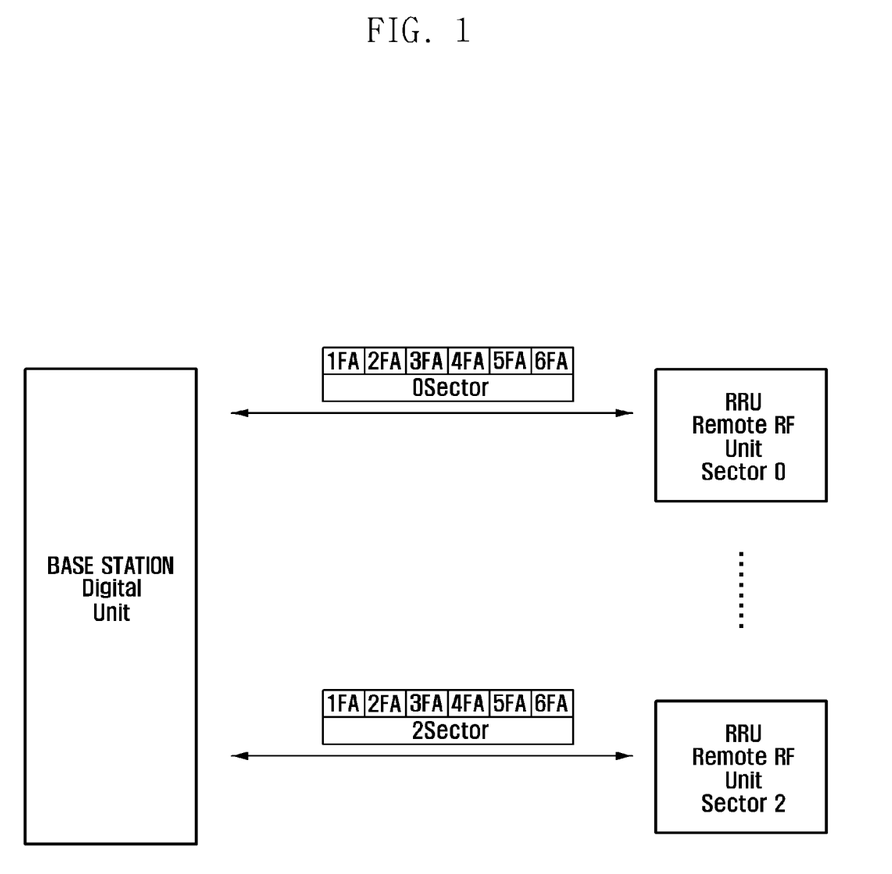
FIG. 1 is a diagram illustrating the configuration of a conventional base station.

Cellular system base stations are typically deployed independently. Accordingly, an increase in the number of RRUs for cell coverage expansion is limited. FIG. 1 is a diagram illustrating a configuration of a conventional base station. FIG. 1 is directed to the conventional base station with three sectors and six Frequency Assignments (FAs). Typically, an n-sector base station is provided with n RRUs.

Figure 2A:
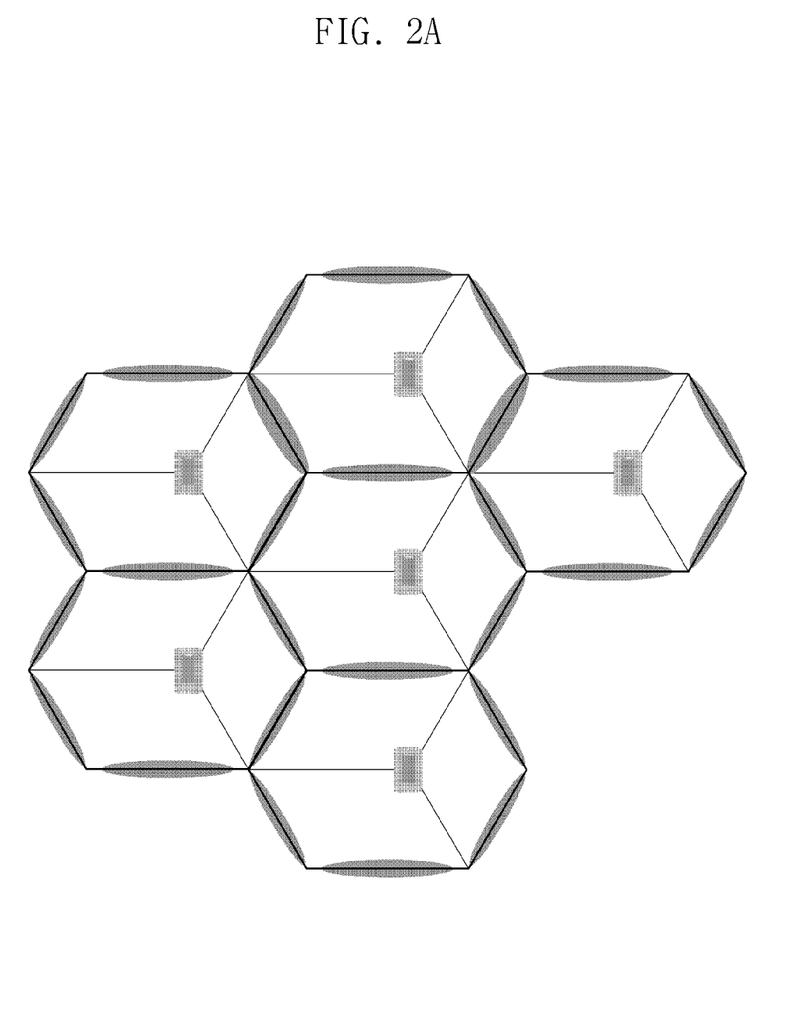
FIG. 2A is a diagram illustrating the hexagonal topology of the conventional cellular system.
Figure 2B:
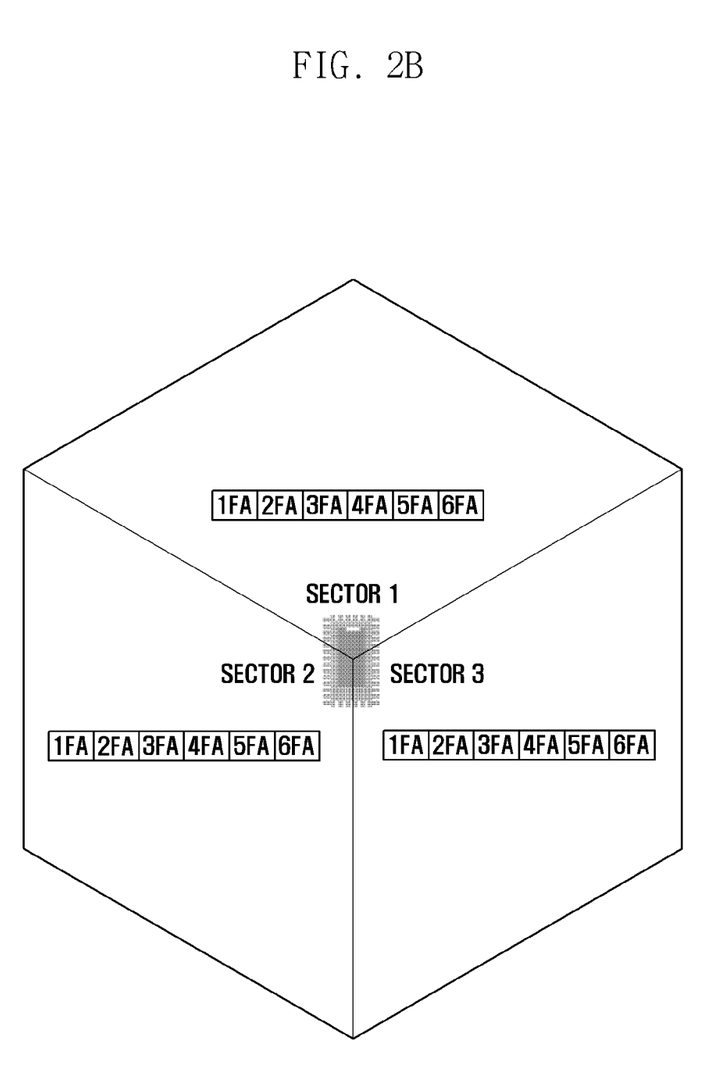
FIG. 2B is a diagram illustrating an enlarged view of a cell of the hexagonal cellular system of FIG. 2A.

FIG. 2A is a diagram illustrating a hexagonal topology of the conventional cellular system, and FIG. 2B is a diagram illustrating an enlarged view of a cell of the hexagonal cellular system of FIG. 2A. As shown in FIG. 2B, a cell is divided into three sectors with FAs. Referring to FIG. 2A, a mobile communication network is composed of a plurality of cells controlled by respective base stations. FIG. 2B is directed to a cell divided into 3 sectors using multiple FAs.

As shown in FIGS. 1, 2A, and 2B, a conventional base station is implemented separate from other base stations. In the case of a cellular mobile communication network composed of a plurality of base stations, each base station has a relatively small cell coverage, such that users on the move cross cell boundaries. Whenever a user crosses a cell boundary, a handover (e.g. soft handover) occurs. However, if the handover occurs frequently, the base stations must prepare for the handover by allocating necessary resources, resulting in unnecessary resource waste and data service restriction. Furthermore, in the conventional system, the throughput per Packet Data Service (PS) decreases as the required subscriber accommodation capacity increases.

SUMMARY OF THE INVENTION

The present invention has been made to address at least the above problems and disadvantages and to provide at least the advantages described below. Accordingly, an aspect of the present invention provides a cascaded base station and an operation method thereof that is capable of improving the system throughput by connecting a plurality of sub-base stations and a plurality of RRUs via a radio resource expansion device in a cascaded manner to operate as a single base station in a time domain and share the RRUs having respective cells.

In accordance with an aspect of the present invention, a cascaded base station apparatus is provided. The cascaded base station apparatus includes a plurality of sub-base stations, each of the plurality of sub-base stations having at least one sector, and each of the at least one sector using at least one FA. The cascaded base station apparatus also includes a plurality of RRUs, each of the plurality of RRUs being responsible for radio communication in a certain sector. The cascaded base station apparatus further includes a radio resource expansion device that receives downlink data from the plurality of sub-base stations, extracts data per FA from the downlink data, rearranges and re-maps the data per sector, and transmits the data per sector to corresponding RRUs.

In accordance with an aspect of the present invention, a method of operating a cascaded base station is provided. Downlink data is received from a plurality of sub-base stations, each of the plurality of sub-base stations having at least one sector, and each of the at least one sector using at least one FA. Data is extracted per FA from the downlink data. The data per sector is rearranged and re-mapped. The data per sector is transmitted to corresponding RRUs.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
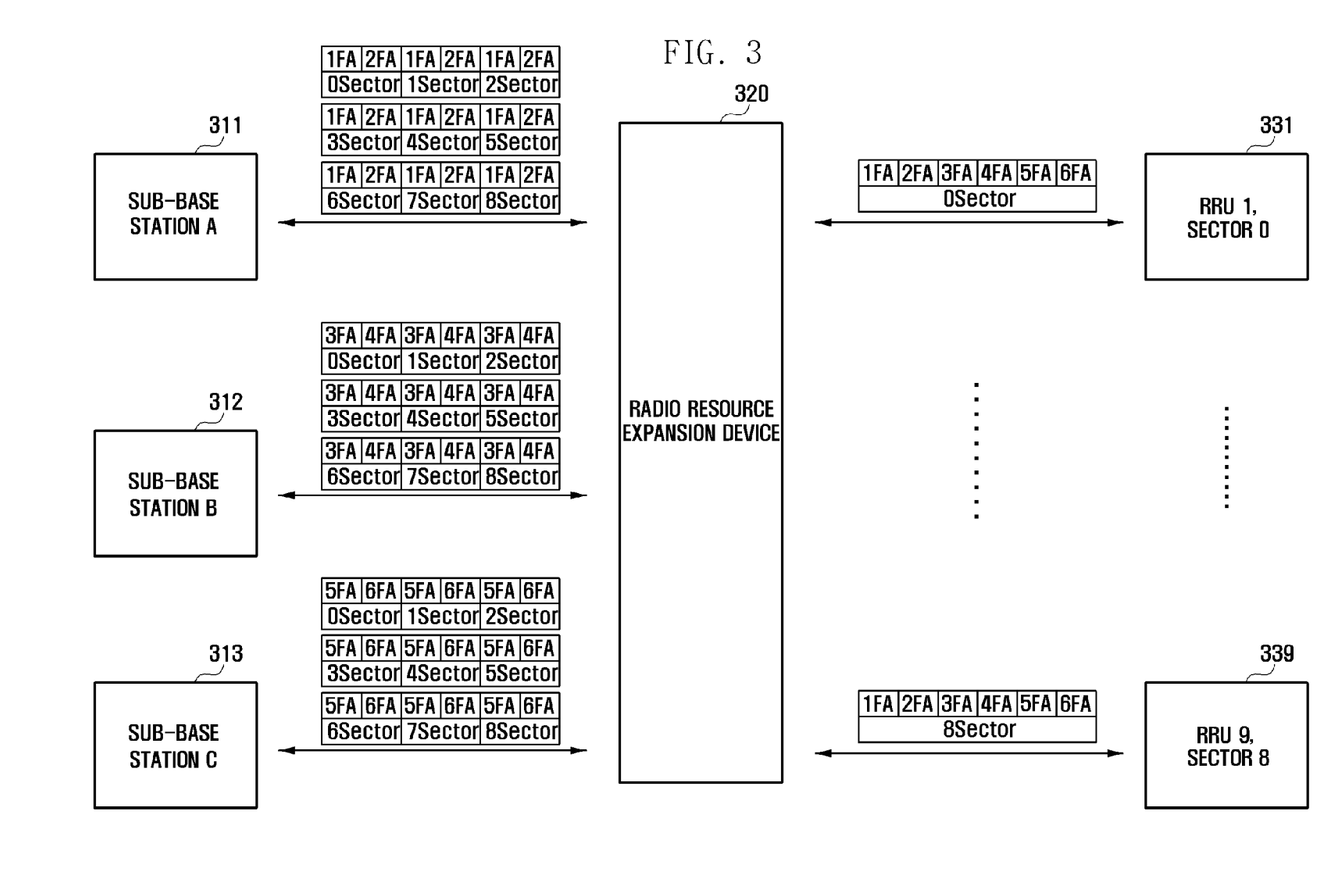
FIG. 3 is a diagram illustrating a configuration of a cascaded base station, according to an embodiment of the present invention.

FIG. 3 is a diagram illustrating a configuration of a cascaded base station, according to an embodiment of the present invention. As shown in FIG. 3, the cascaded base station, according to an embodiment of the present invention, includes three sub-base stations 311, 312, and 313, a radio resource expansion device 320, and nine RRUs 331 to 339.

In the following description, with reference to accompanying drawings, each sub-base station is capable of managing total 18 FAs, and 9 RRUs 331 to 339 correspond to 9 sectors, respectively. However, embodiments of the present invention are not limited to such a specific configuration but can be implemented in other modified examples.

Each sub-base station transmits downlink data to a terminal through the RRUs 331 to 339. According to an embodiment of the present invention, each sub-base station is capable of managing at least one sector using at least one FA and transmitting downlink data to the radio resource expansion device 320.

Referring to FIG. 3, the sub-base station A 311 uses FA 1 and FA 2 for every sector, i.e., sector 0, sector 1, sector 2, sector 3, sector 4, sector 5, sector 6, sector 7, and sector 8. The sub-base station B 312 uses FA 3 and FA 4 for every sector, i.e., sector 0, sector 1, sector 2, sector 3, sector 4, sector 5, sector 6, sector 7, and sector 8. The sub-base station C 313 uses FA 5 and FA 6 for every sector, i.e., sector 0, sector 1, sector 2, sector 3, sector 4, sector 5, sector 6, sector 7, and sector 8.

According to an embodiment of the present invention, each sub-base station is capable of connecting to one or more neighbor sub-base stations to acquire reference clock synchronization. Once the adjacent sub-base stations 311, 312, and 313 connect to each other, one of the connected sub-base stations is capable of receiving a clock signal as a clock input signal from another sub-base station, and sending the clock signal as clock input signal to still another sub-base station. The connection for synchronization among the sub-base stations is described in greater detail below with reference to FIGS. 8 and 9.

Each RRU performs radio communication with a mobile terminal within a sector under its charge. According to an embodiment of the present invention, if an RRU is in charge of a sector, the RRU performs radio communication with the mobile terminal within the sector.

In FIG. 3, the RRU1 331 is responsible for radio communication with terminals within sector 0. RRU9 339 is responsible for radio communication with terminals within sector 8. RRU2 is responsible for radio communication with terminals within sector 1. RRU3 is responsible for radio communication with terminals within sector 2. RRU4 is responsible for radio communication with terminals within sector 3. RRU5 is responsible for radio communication with terminals within sector 4. RRU6 is responsible for radio communication with terminals within sector 5. RRU7 is responsible for radio communication with terminals within sector 6. RRU8 is responsible for radio communication with terminals within sector 7.

Each RRU receives downlink data from the radio resource expansion device 320 and delivers the downlink data to the mobile terminal within the sector corresponding to the RRU. The RRU also receives uplink data from the mobile terminal within the sector corresponding to the RRU and delivers the uplink data to the radio resource expansion device 320.

The radio resource expansion device 320 connects the sub-base stations 311, 312, and 313 and the RRUs 331 to 339. According to an embodiment of the present invention, the radio resource expansion device 320 receives downlink data from the sub-base stations 311, 312, and 313, extracts FAs from the downlink data, sorts the FAs by sector, re-maps the data per sector, and delivers to the RRU corresponding to the sector.

According to an embodiment of the present invention, the Virtual Switching System (VSS) channel control for controlling the RRUs 331 to 339 is transmitted by the base station in the form of process data, which is terminated at the radio resource expansion device 320 to be inserted to the VSS channel addressed to the RRUs 331 to 339. The corresponding data is written in the Field Programmable Gate Array (FPGA) Register known to the processor of the radio resource expansion device 320, and mapped to the VSS channel of the RRUs 331-339.

The I/Q data transfers of the RRUs 331 to 339 are configured in such a way that each RRU can transmit 6 carriers and each sub-base station is connected to each RRU. Thus, the radio resource expansion device 320 terminates all data transmitted by the respective base stations, remaps the I/Q data addressed to the RRUs 331 to 339, and multiplexes the 2 cell data from the base stations into 6 cell data (e.g., Common Public Radio Interface (CPRI) 2.5G Wideband Code Division Multiple Access (WCDMA) I/Q data) to be delivered to each RRU.

More specifically, the radio resource expansion device 320 receives downlink data from the sub-base stations 311, 312, and 313 (i.e., sub-base stations A, B, and C). Referring to the downlink data from the sub-base stations 311, 312, and 313 to the radio resource expansion device 320, each sub-base station uses two FAs for all the sectors under its charge in transmission to the radio resource expansion device 320.

Specifically, the radio resource expansion device 320 receives data from the sub-base station A 311 using the FA1 and FA2 in sector 0, sector 1, sector 2, sector 3, sector 4, sector 5, sector 6, sector 7, and sector 8. The radio resource expansion device 320 receives data from the sub-base station B 312 using the FA3 and FA4 in sector 0, sector 1, sector 2, sector 3, sector 4, sector 5, sector 6, sector 7, and sector 8. The radio resource expansion device 320 receives data from the sub-base station C 313 using the FA5 and FA6 in sector 0, sector 1, sector 2, sector 3, sector 4, sector 5, sector 6, sector 7, and sector 8.

The radio resource expansion device 320 rearranges and re-maps the received downlink data. Specifically, the radio resource expansion device 320 also extracts the FA1 and FA2 data from the downlink data of the sub-base station A 311, the FA3 and FA4 data from the downlink data of the sub-base station B 312, and the FA5 and FA6 data from the downlink data of the sub-base station C 313 in sector 0. The radio resource expansion device 320 rearranges the FAs for sector 0 in the order of FA1, FA2, FA3, FA4, FA5, and FA6.

The radio resource expansion device 320 also extracts the FA1 and FA2 data from the downlink data of the sub-base station A 311, the FA3 and FA4 data from the downlink data of the sub-base station B 312, and the FA5 and FA6 data from the downlink data of the sub-base station C 313 in sector 1. The radio resource expansion device 320 rearranges the FAs for sector 1 in the order of FA1, FA2, FA3, FA4, FA5, and FA6.

The radio resource expansion device 320 performs re-mapping of the downlink data for all sectors as described above. The radio resource expansion device 320 transmits the re-mapped downlink data to the corresponding RRUs 331 to 339 responsible for the respective sectors. The downlink data transmitted from the respective sub-base stations 311, 312, and 313 to the corresponding RRUs 331 to 339, via the radio resource expansion device 320, is delivered to internal processors of the RRUs 331 to 339 in an Internet Protocol (IP) data format.

Referring to FIG. 3, the radio resource expansion device 320 delivers the 1FA, 2FA, 3FA, 4FA, 5FA, and 6FA data remapped for sector 0 to the RRU 1 331. The radio resource expansion device 320 delivers the downlink data re-mapped for other sectors to the corresponding RRUs 332 to 339 in the same manner.

According to an embodiment of the present invention, the radio resource expansion device 320 receives uplink data from the RRUs 331 to 339. The radio resource expansion device 320 extracts the same FA data for different sectors from the received uplink data, rearranges and de-maps the extracted FA data per at least one same FA, and delivers the FA data to the corresponding sub-base stations 311, 312, and 313. The demapping procedure is the inverse procedure of the remapping procedure. Specifically, the uplink data transmitted from the RRUs 331 to 339 to the base station are sent to the processor of the radio resource expansion device 320 to be de-mapped and then delivered to the respective sub-base stations 311 312, and 313.

In more detail, the radio resource expansion device 320 receives the uplink data transmitted by the RRUs 331 to 339 in the sectors managed by respective RRUs 331 to 339. Specifically, the RRU 1 331 is responsible for sector 0, such that the radio resource expansion device 320 receives the FA1, FA2, FA3, FA4, FA5, and FA6 data for sector 0 from the RRU 1 331. The radio resource expansion device 320 also receives the uplink data in other sectors associated with the other RRUs 332 to 339 in the same manner.

The radio resource expansion device 320 extracts the same FA data from the received uplink data and rearranges and de-maps the extracted data. Specifically, the radio resource expansion device 320 extracts the FA1, FA2, FA3, FA4, FA5, and FA6 data for the respective sectors from sector 0 to sector 8 and rearranges the data per FA pair used by each sub-base station. That is, the radio resource expansion device 320 extracts and rearranges the FA1 and FA2 data for sector 0, sector 1, sector 2, sector 3, sector 4, sector 5, sector 6, sector 7, and sector 8 in association with the sub-base station A 311 using FA1 and FA2 for each sector. The radio resource expansion device 320 extracts and rearranges the FA3 and FA4 for sector 0, sector 1, sector 2, sector 3, sector 4, sector 5, sector 6, sector 7, and sector 8 in association with the sub-base station B 312 using FA3 and FA4 for each sector. The radio resource expansion device 320 extracts and rearranges the FA5 and FA6 for sector 0, sector 1, sector 2, sector 3, sector 4, sector 5, sector 6, sector 7, and sector 8 in association with the sub-base station C 313 using FA5 and FA6 for each sector.

The radio resource expansion device 320 delivers the de-mapped uplink data to the respective sub-base stations 311, 312, and 313 using the corresponding FAs.

In the case of the above-described cascaded base station, the sub-base stations 311, 312, and 13 and the RRUs 331 to 339 are connected to each other in the same communication protocol format, such that the radio resource expansion device 320 works as a single base station and has a communication structure supporting the cascaded base station with data termination.

Figure 4A:
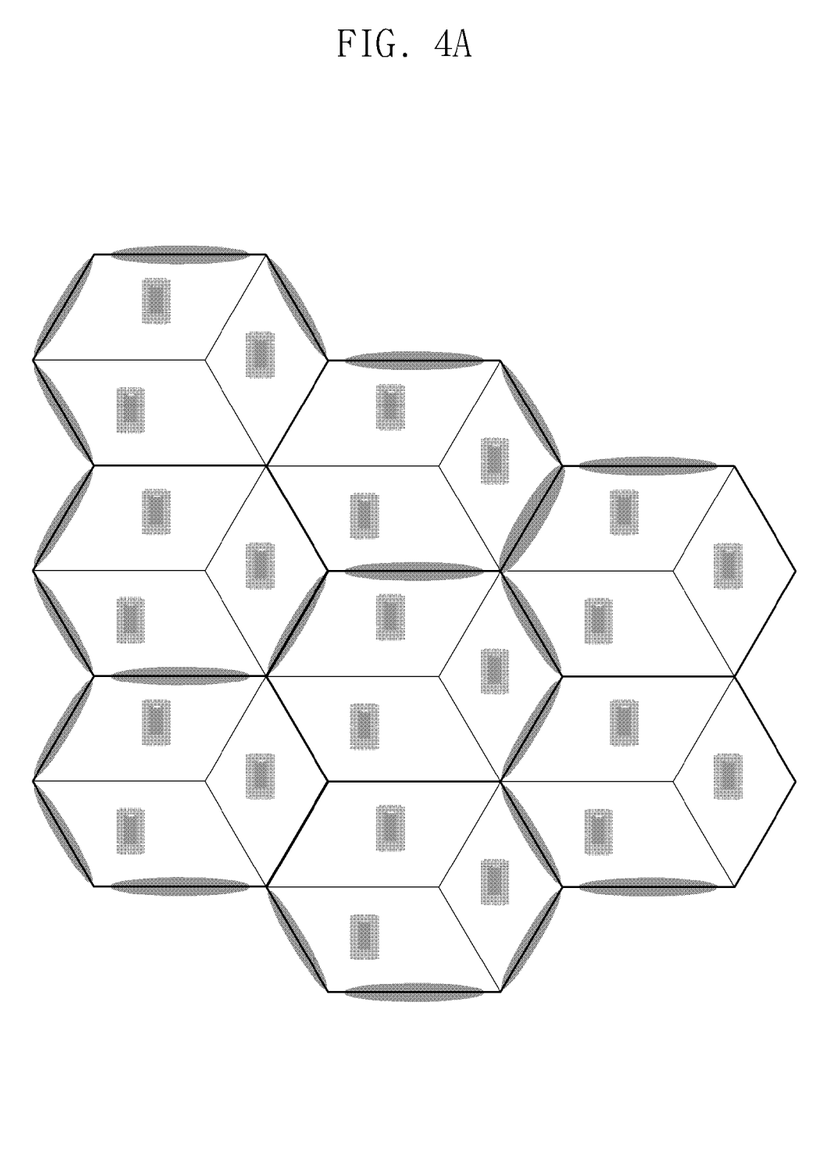
FIG. 4A is a diagram illustrating cell coverage of the cascaded base station, according to an embodiment of the present invention.

The cell coverage of the cascaded base station of FIG. 3 can be depicted as shown in FIG. 4A. FIG. 4A is a diagram illustrating the cell coverage of the cascaded base station, according to an embodiment of the present invention.

Comparing FIG. 4A with FIG. 2, the cell coverage of the cascaded base station, according to an embodiment of the present invention, is three times larger than the cell coverage of the legacy base station depicted in FIG. 2. Accordingly, by cascading a plurality of base station to work as a single base station, it is possible to increase the radio resource allocation range of the base station and expand the cell coverage. If the cell coverage of a base station increases, the number of handover occurrences, and thus, the handover standby resources decrease, resulting in improvement of network service quality and system management and construction cost savings.

Figure 4B:
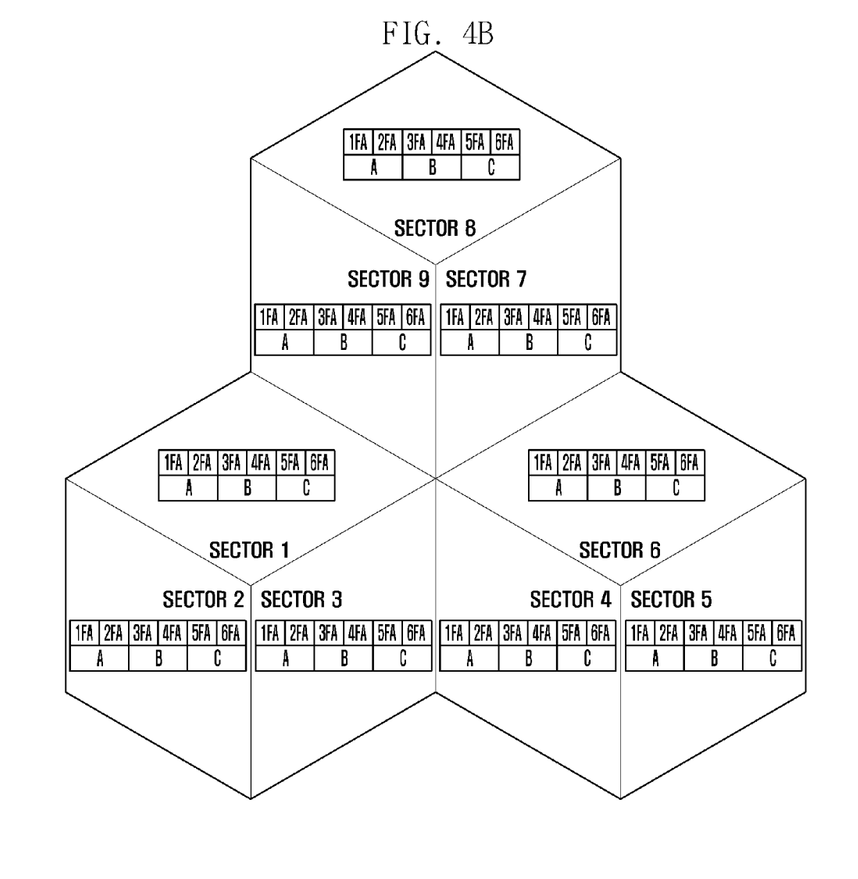
FIG. 4B is a diagram illustrating a sector and FA allocation configuration of the cascaded base station, according to an embodiment of the present invention.

FIG. 4B is a diagram illustrating the sector and FA allocation configuration of the cascaded base station, according to an embodiment of the present invention.

Referring to FIG. 4B, the sectors are mapped to the FA1 and FA2 of the sub base station A 311, FA3 and FA4 of the sub-base station B 312, and FA5 and FA6 of the sub-base station C 313.

Figure 5:
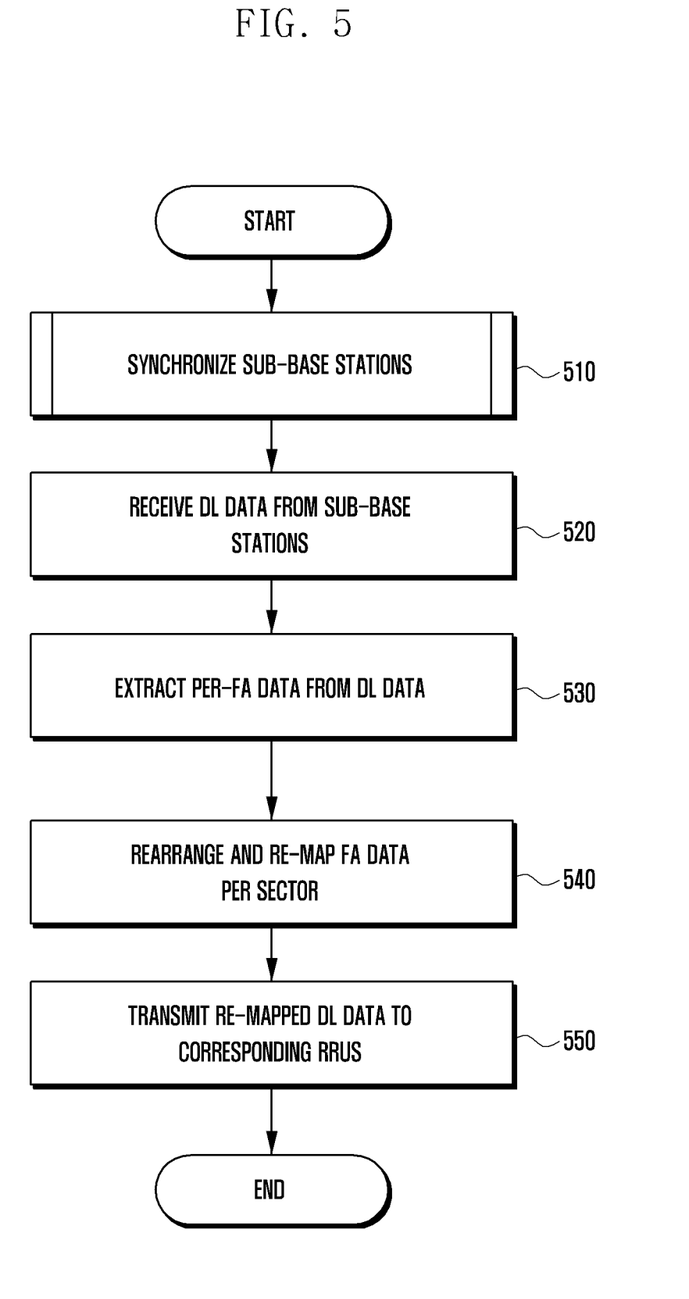
FIG. 5 is a flowchart illustrating an operation method of the cascaded base station, according to an embodiment of the present invention.

FIG. 5 is a flowchart illustrating an operation method of the cascaded base station, according to an embodiment of the present invention.

The radio resource expansion device 320 first acquires synchronization among the sub-base stations 311, 312, and 313, at step 510. The synchronization procedure is described in greater detail below with reference to FIGS. 8 and 9. After acquiring synchronization among the sub-base stations 311, 312, and 313, the radio resource expansion device 320 receives downlink data from the respective sub-base stations 311, 312, and 313, in step 520.

The radio resource expansion device 320 extracts FAs per sector from the received downlink data, in step 530. The radio resource expansion device 320 rearranges and remaps the extracted FAs per sector, in step 540, and transmits the re-mapped downlink data to the respective RRUs 331 to 339, in step 550.

The re-mapping procedure is described above with reference to FIG. 3.

Figure 6:
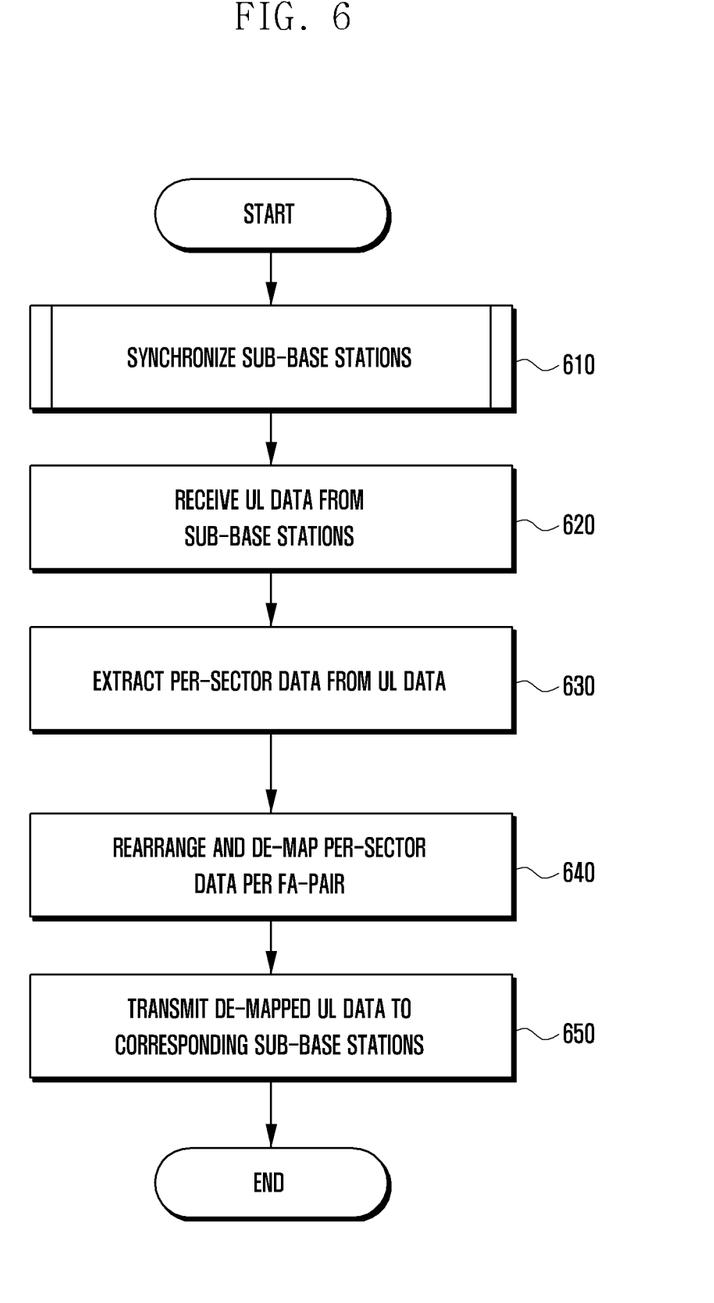
FIG. 6 is a flowchart illustrating an operation method of the cascaded base station, according to another embodiment of the present invention.

FIG. 6 is a flowchart illustrating an operation method of the cascaded base station, according to another embodiment of the present invention.

The radio resource expansion device 320 first acquires synchronization among the sub-base stations 311, 312, and 313, in step 610. The synchronization procedure is described in greater detail below with reference to FIGS. 8 and 9. After acquisition of synchronization among the sub-base stations 311, 312, and 313, the radio resource expansion device 320 receives uplink data from the respective RRUs 331 to 339, in step 620.

The radio resource expansion device 320 extracts per-sector data from the received uplink data, in step 630. After extracting the per-sector data, the radio resource expansion device 320 rearranges and de-maps the extracted data per sector, in step 640, and delivers the de-mapped uplink data to the respective sub-base stations 311, 312, and 313, in step 650.

The de-mapping procedure is described above with reference to FIG. 3.

Figure 7:
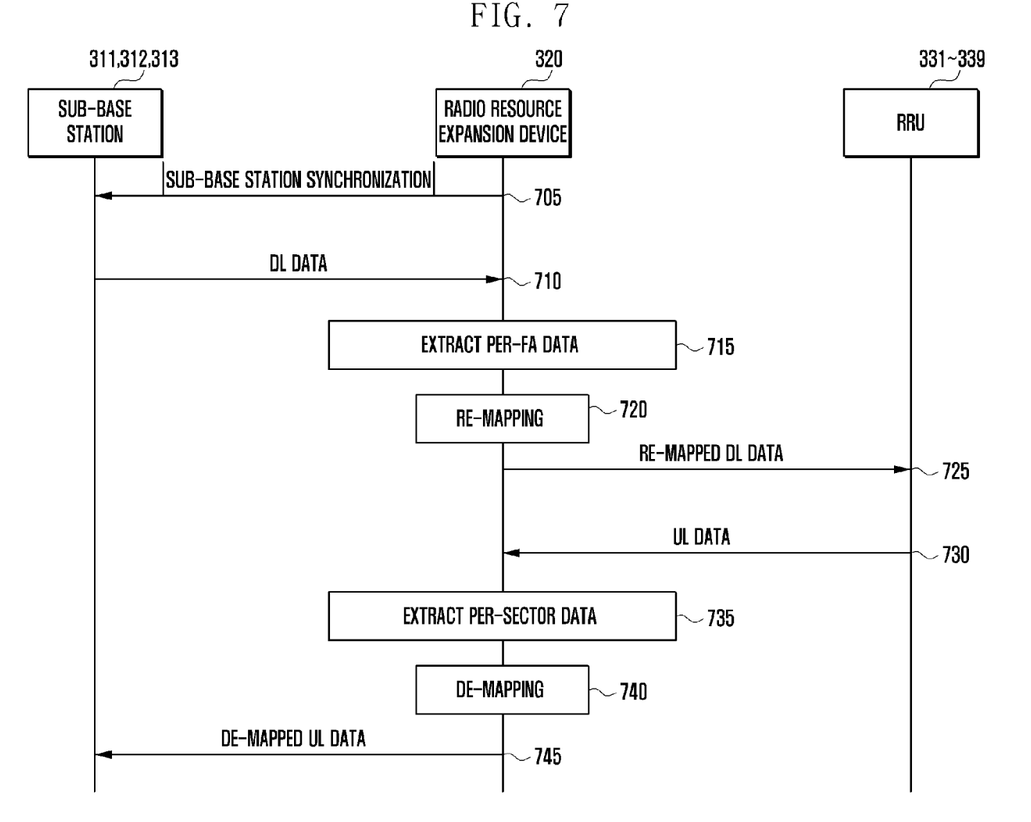
FIG. 7 is a signal flow diagram illustrating signal flows among a sub-base station, a radio resource expansion device, and an RRU in the cascaded base station, according to an embodiment of the present invention.

FIG. 7 is a signal flow diagram illustrating signal flows among the sub-base stations, the radio resource expansion device, and the RRUs in the cascaded base station, according to an embodiment of the present invention.

The radio resource expansion device 320 first acquires synchronization among the sub-base stations 311, 312, and 313, in step 705. The radio resource expansion device 320 receives downlink data from the respective sub-base stations 311, 312, and 313, in step 710.

The radio resource expansion device 320 extracts per-FA data from the downlink data of the respective sub-base stations, in step 715. The radio resource expansion device 320 rearranges and re-maps the per-FA data per sector, in step 720, and transmits the re-mapped downlink data to the respective RRUs 331 to 339, in step 725.

The radio resource expansion device 320 receives uplink data from the respective RRUs 331 to 339, in step 730. The radio resource expansion device 320 extracts per-FA data from the received uplink data, in step 735. The radio resource expansion device 320 rearranges and de-maps the uplink data per sector, in step 740, and then transmits the de-mapped uplink data to the respective sub-base stations 311, 312, and 313, in step 745.

Figure 8:
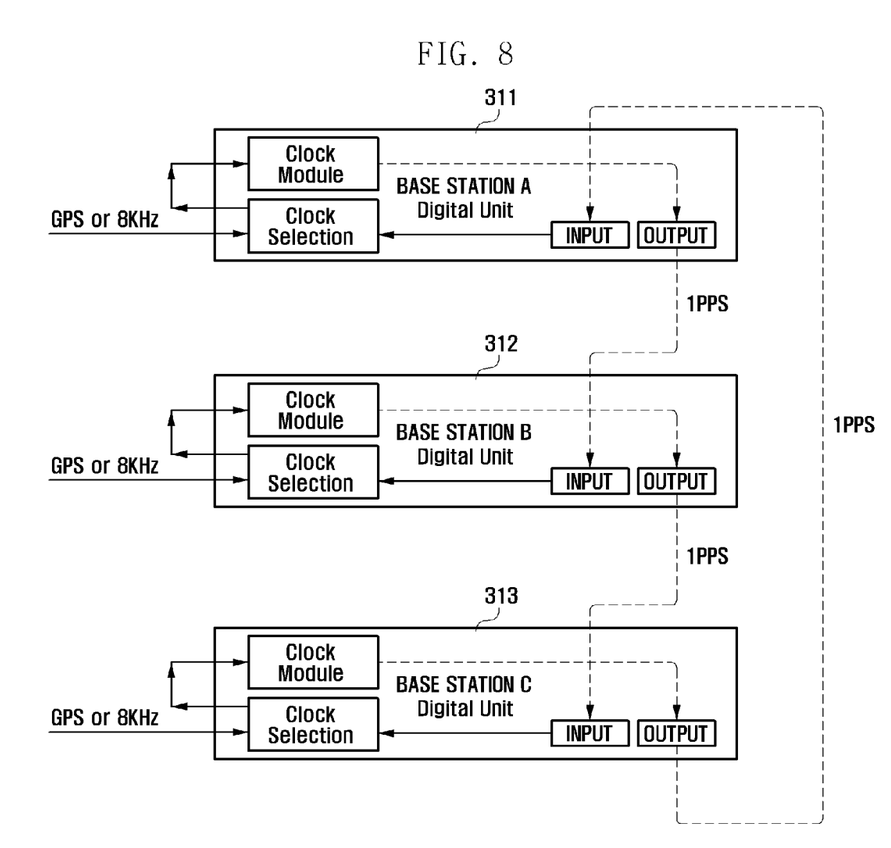
FIG. 8 is a block diagram illustrating interconnection of the sub-base stations of the cascaded base station, according to an embodiment of the present invention.

FIG. 8 is a block diagram illustrating an interconnection of the sub-base stations of the cascaded base station, according to an embodiment of the present invention.

According to an embodiment of the present invention, the sub-base stations 311, 312, and 313 are connected in a cascaded manner, and thus, it is necessary to synchronize the reference clock among the sub-base stations in a time domain to avoid malfunctioning of the RRUs caused by synchronization failure.

The sub-base stations 311, 312, or 313 are capable of establishing connections with neighbor sub-base stations to acquire reference clock synchronization. Once the sub-base stations 311, 312, and 313 are connected among each other, each sub-base station receives the clock signal from the neighbor sub-base station as a clock input signal, and transmits the clock signal of the neighbor sub-base station to another neighbor sub-base station.

As shown in FIG. 8, the clock input signal of the sub-base station A 311 corresponds to the clock output signal of the sub-base station C 313. The sub-base station A 311 references the input clock signal and Global Positioning System (GPS), or 8 KHz signal, to select a clock signal, and sends the selected clock signal to a clock module. The clock module determines the received clock signal as a reference clock of the sub-base station A 311.

The clock output signal of the sub-base station A 311 becomes the clock input signal of the sub-base station B 312. The sub-base station B 312 transmits the clock output signal to the sub-base station C 313 in the same manner as the sub-base station A 311. The sub-base station C 313 uses the clock signal from the sub-base station B 312 as the clock input signal to determine the reference clock, and then transmits the clock output signal to the sub-base station A 311, for use as its clock input signal.

As above described, each of the sub-base stations 311, 312, and 313 uses the clock output signal from another sub-base station as its clock input signal to acquire reference clock synchronization.

Since the sub-base stations 311, 312, and 313 are integrated into a base station there is no need for a communication path among the sub-base stations 311, 312, and 313. The radio resource expansion device 320 is capable of configuring any of the sub-base stations 311, 312, and 313 as a master base station and the others as slave base stations, such that the clock signals of the slave base stations are synchronized to the clock signal of the master base station.

The sub-base stations 311, 312, and 313 and the radio resource expansion device 320 exchange messages periodically to manage the clock condition. If an operational error disturbing clock signal synchronization, such as, for example, a communication failure of the master base station, or clock board problem occurs, the radio resource expansion device 320 cancels the configuration of the master base station and configures one of the other sub-base stations as a new master base station.

If multiple sub-base stations are designated as the master base station, it may cause problems in interoperation among the nodes of the cascade base station. Accordingly, if an operational error occurs, the master base station may be transitioned to the slave state.

All data received, by the radio resource expansion device 320, from the sub-base stations 311, 312, and 313 may show phase differences due to the delay between clock cable nodes, or on-board delay even in the synchronized state. In order to compensate such clock signal delays, the radio resource expansion device 320 may include a delay buffer.

Jitter may occur at both ends of the delay buffer. In order to absorb such jitter, the radio resource expansion device 320 also may also include a jitter buffer.

Figure 9:
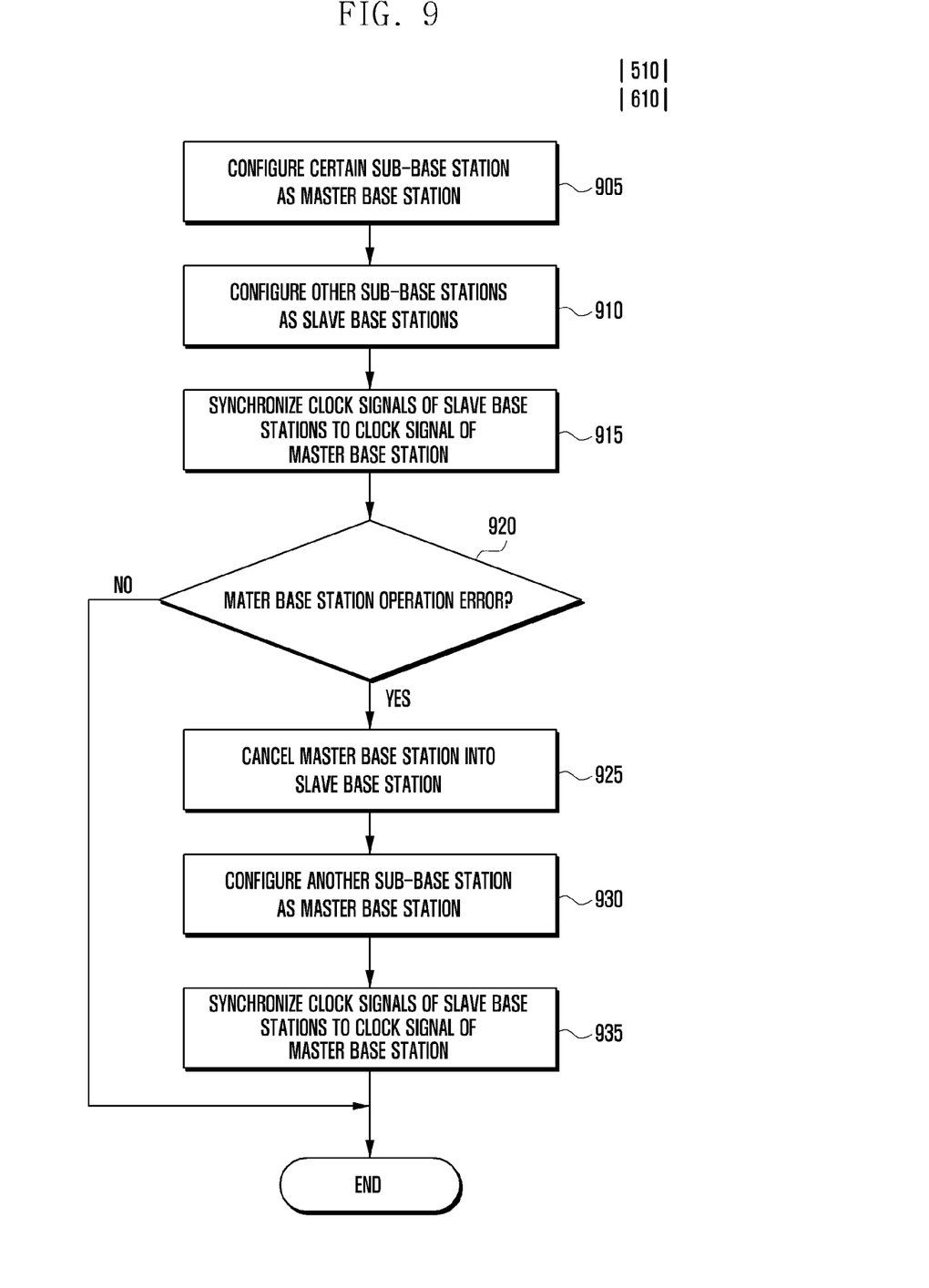
FIG. 9 is a flowchart illustrating a sub-base station synchronization procedure in the operation method of the cascaded base station, according to an embodiment of the present invention.

FIG. 9 is a flowchart illustrating a sub-base station synchronization procedure in the operation method of the cascaded base station, according to an embodiment of the present invention. FIG. 9 is a detailed description of step 510 of FIG. 5 and step 610 of FIG. 6.

The radio resource expansion device 320 configures a certain sub-base station as a master base station, in step 905, and configures other sub-base stations as slave base stations, in step 910. The radio resource expansion device 320 controls the clock signals of the slaves base stations to be synchronized to the clock signal of the master base station, in step 915.

The radio resource expansion device 320 determines whether an operational error occurs at the master base station, in step 920. If no operational error is detected, the radio resource expansion device 320 terminates the procedure. If an operational error is detected, the master base station is transitioned to be a slave base station, in step 925.

The radio resource expansion device 320 configures another sub-base station as a new master base station, in step 930, and controls the clock signals of the slave base stations to be synchronized to the clock signal of the new master base station, in step 935.

Through the above-described clock signal synchronization procedure, the radio resource expansion device 320 is capable of delivering the data received from the sub-base stations 311, 312, and 313 to the RRUs 331 to 339 in the same time domain. The radio resource expansion device 320 is also capable of delivering the data received from the RRUs 331 to 339 to the respective sub-base stations 311, 312, and 313 in the same time domain.

As described above, the cascaded base station apparatus and operation method thereof, according to embodiments of the present invention, are capable of increasing the radio resource allocation range of a base station and expanding cell coverage by connecting a plurality of sub-base stations in a cascaded manner to operate as a single base station.

The cascaded base station apparatus and operation method thereof is also capable of expanding the cell coverage, and thus, reducing the number of soft handovers, which results in a reduction of radio resource waste and mobile communication network management and construction costs, and an improvement in network service quality.

Although embodiments of the present invention have been described in detail above using specific terminology, this is for the purpose of describing particular embodiments only and not intended to be limiting of the present invention. While the invention has been shown and described with reference to certain embodiments thereof, it will be understood by those skilled in the art that various changes in form and detail may be made without departing from the spirit and scope of the invention.

What is claimed is:

1. A cascaded base station apparatus comprising:
a plurality of sub-base stations, each of the plurality of sub-base stations having at least one sector, and each of the at least one sector using at least one Frequency Assignment (FA);

a plurality of Remote Radio Units (RRUs), each of the plurality of RRUs being responsible for radio communication in a certain sector; and a radio resource expansion device that receives downlink data from the plurality of sub-base stations, extracts data per FA from the downlink data, rearranges and re-maps the data per sector, and transmits the data per sector to corresponding RRUs.

2. The cascaded base station of claim 1, wherein the radio resource expansion device receives uplink data from the plurality of RRUs, extracts data per sector from the uplink data, rearranges and de-maps the data per data unit including at least one FA data, and transmits the data per data unit to corresponding sub-base stations.

3. The cascaded base station of claim 1, wherein each of the plurality of sub-base stations connects to neighbor sub-base stations to acquire synchronization of a reference clock.

4. The cascaded base station of claim 1, wherein each of the plurality of sub-base stations receives a clock input signal from a neighbor sub-base station, and sends a clock output signal to another neighbor sub-base station.

5. The cascaded base station of claim 4, wherein the radio resource expansion device configures one of the plurality of sub-base stations as a master base station and the remaining of the plurality of sub-base stations as slave base stations, and synchronizes clock signals of the slave base stations to a clock signal of the master base station.

6. The cascaded base station of claim 5, wherein the radio resource expansion device monitors to detect an operational error, reconfigures the master base station as a slave base station when the operation error is detected, and configures another of the plurality of sub-base stations as a new master base station.

7. The cascaded base station of claim 6, wherein each of the plurality of sub-base stations comprises a delay buffer for compensating for a delay of the clock signal.

8. The cascaded base station of claim 7, wherein each of the plurality of sub-base stations comprises a jitter buffer for absorbing jitter occurring at both ends of the delay buffer.

9. A method of operating a cascaded base station, comprising the steps of:
receiving downlink data from a plurality of sub-base stations, each of the plurality of sub-base stations having at least one sector, and each of the at least one sector using at least one Frequency Assignment (FA);
extracting data per FA from the downlink data;
rearranging and re-mapping the data per sector; and
transmitting the data per sector to corresponding Remote Radio Units (RRUs).

10. The method of claim 9, further comprising:
receiving uplink data from a plurality of RRUs;
extracting data per sector from the uplink data;
rearranging and de-mapping the data per data unit including at least one FA data; and
transmitting the data per data unit to corresponding sub-base stations.

11. The method of claim 10, further comprising connecting each of the plurality of sub-base stations to neighbor sub-base stations to acquire synchronization of a reference clock.

12. The method of claim 11, further comprising:
receiving, at each of the plurality of sub-base stations, a clock input signal from a neighbor sub-base station; and
sending a clock output signal to another neighbor sub-base station.

13. The method of claim 12, further comprising:
configuring, before receiving the downlink data, one of the plurality of sub-base stations as a master base station and the remaining of the plurality of sub-base stations as slave base stations; and
synchronizing clock signals of the slave base stations to a clock signal of the master base station.

14. The method of claim 13, further comprising:
monitoring to detect an operational error;
reconfiguring the master base station as a slave base station, when the operation error is detected; and
configuring another of the plurality of sub-base stations as a new master base station.

15. The method of claim 14, wherein each of the plurality of sub-base stations comprises a delay buffer for compensating for a delay of the clock signal.

16. The method of claim 15, wherein each of the sub-base stations comprises a jitter buffer for absorbing jitter occurring at both ends of the delay buffer.

\* \* \* \* \*